(12) United States Patent
Forsyth et al.

(10) Patent No.: US 9,071,468 B2
(45) Date of Patent: Jun. 30, 2015

(54) APPARATUS AND METHODS FOR A SCALABLE COMMUNICATIONS NETWORK

(75) Inventors: James W. Forsyth, Royal Oak, MI (US); Bernard Ku, Austin, TX (US); Lakshminarashimhan Naidu, Pearland, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 401 days.

(21) Appl. No.: 13/609,420

(22) Filed: Sep. 11, 2012

(65) Prior Publication Data

US 2014/0071979 A1    Mar. 13, 2014

(51) Int. Cl.
*H04L 12/66* (2006.01)
*H04M 7/00* (2006.01)

(52) U.S. Cl.
CPC ............ *H04L 12/66* (2013.01); *H04M 7/0075* (2013.01)

(58) Field of Classification Search
CPC .................. H04L 61/1511; H04L 29/12066
See application file for complete search history.

(56) References Cited

U.S. PATENT DOCUMENTS

| | | | |
|---|---|---|---|
| 7,274,683 B2 | 9/2007 | Segal | |
| 7,277,421 B1 | 10/2007 | Pershan | |
| 7,426,576 B1 * | 9/2008 | Banga et al. | 709/245 |
| 7,529,231 B2 | 5/2009 | Soo | |
| 7,778,231 B2 | 8/2010 | Ku | |
| 7,796,578 B2 | 9/2010 | Stafford | |
| 2008/0019356 A1 * | 1/2008 | Marsico | 370/352 |
| 2010/0150145 A1 | 6/2010 | Ku | |
| 2010/0158229 A1 | 6/2010 | Ku | |
| 2010/0250680 A1 * | 9/2010 | Bhatt et al. | 709/206 |
| 2011/0182287 A1 * | 7/2011 | Ku | 370/352 |

OTHER PUBLICATIONS

Tiso, "Designing Cisco Network Service Architectures (ARCH) Foundation Learning Guide: (CCDP ARCH 642-874)", 3rd Edition, Cisco Press, pub. on Nov. 1, 2011.*
Microsoft, "How DNS query works", http://technet.microsoft.com/en-us/library/cc775637(d=printer,v=ws.10).aspx, Jan. 21, 2005.

* cited by examiner

*Primary Examiner* — Khaled Kassim
*Assistant Examiner* — Zhaohui Yang
(74) *Attorney, Agent, or Firm* — Guntin & Gust, PLC; Douglas Schnabel

(57) ABSTRACT

A method that incorporates teachings of the subject disclosure may include, for example, transmitting a first request for a name authority pointer to a first in-region name server of a plurality of in-region name servers of a first geographic region responsive to determining that a telephone number of a call is located in the first geographic region, transmitting a second request for the name authority pointer to an out-of-region name server associated with a second geographic region responsive to determining that the telephone number is located in the second geographic region, and receiving the name authority pointer from at least one of the in-region name server or the out-of-region server. Other embodiments are disclosed.

20 Claims, 13 Drawing Sheets

500

900

1000

1100

APPARATUS AND METHODS FOR A SCALABLE COMMUNICATIONS NETWORK

FIELD OF THE DISCLOSURE

The subject relates generally to telecommunications and more specifically to an apparatus and methods for a scalable communications network.

BACKGROUND

As communications technology improves and demand for communication services grows, providers often seek to adjust systems to incorporate the improved technology and expand those systems to accommodate the growing demand. Systems that are slow to adjust or expand can be undesirable and are often rendered obsolete. Systems that expand by providing unnecessary redundancy are inefficient and costly. Advances in telecommunication technologies create opportunities for integrating communication capabilities as well as challenges for transitioning between technological generations.

BRIEF DESCRIPTION OF THE DRAWINGS

Reference will now be made to the accompanying drawings, which are not necessarily drawn to scale, and wherein.

DETAILED DESCRIPTION

Figure 1:
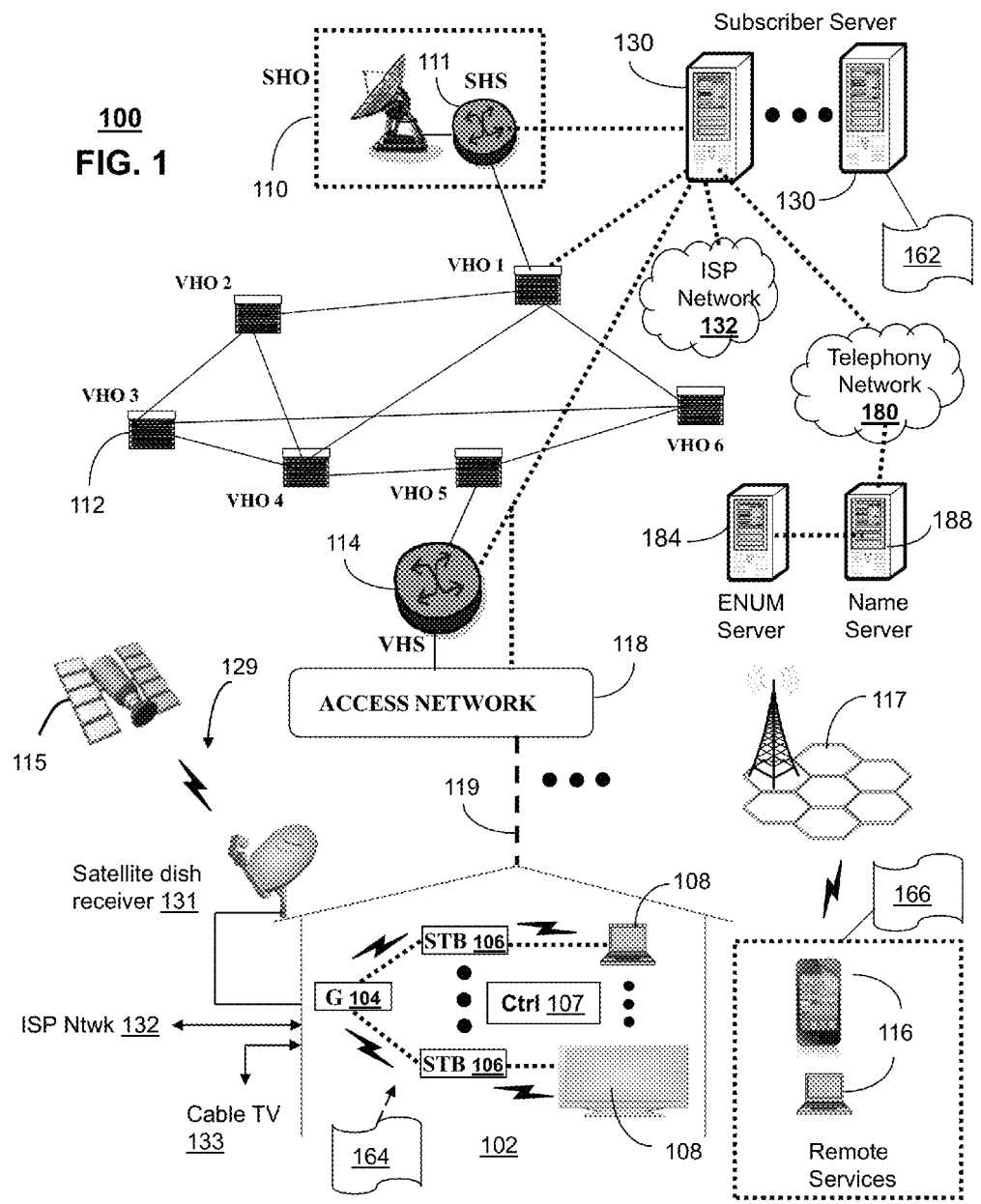
FIGS. 1-2 depict illustrative embodiments of communication systems that provide media services.

The subject disclosure describes, among other things, illustrative embodiments for scaling a tElephone NUmber Mapping (ENUM) service in a communications network. Other embodiments are described in the subject disclosure.

One embodiment of the subject disclosure includes a method that can include determining, by a telephone number mapping server comprising a processor, whether a telephone number is located in a first geographic region of a plurality of geographic regions based on a numbering plan area code of the telephone number. The method can further include receiving, by the telephone number mapping server, a name authority pointer from a first in-region name server of a plurality of in-region name servers of the first geographic region responsive to determining that the telephone number is located in the first geographic region. The method can also include identifying, by the telephone number mapping server, a second geographic region of the plurality of geographic regions that is associated with the telephone number based on the numbering plan area code of the telephone number responsive to determining that the telephone number is not located in the first geographic region and forwarding the request for the name authority pointer associated with the telephone number to an out-of-region name server that is associated with the second geographic region responsive to identifying the second geographic region. The method can include receiving, by the telephone number mapping server, the name authority pointer from the out-of-region name server responsive to forwarding the request for the name authority pointer and, in turn, transmitting, by the telephone number mapping server, the received name authority pointer to a call session control function associated with the call.

One embodiment of the subject disclosure includes a device having a cache memory, a memory storing computer instructions, and a processor coupled to the memory. The processor, responsive to executing the computer instructions, can perform operations for determining whether a telephone number is located in a first geographic region of a plurality of geographic regions responsive to receiving a first request for a name authority pointer associated with the telephone number. The processor, further responsive to executing the computer instructions, can perform operations for transmitting a second request for the name authority pointer to a first in-region name server of a plurality of in-region name servers of the first geographic region responsive to determining that the telephone number is located in the first geographic region and receiving the name authority pointer from the first in-region name server responsive to transmitting the second request. The processor, responsive to executing the computer instructions, can perform also operations for identifying a second geographic region of the plurality of geographic regions that is associated with the telephone number responsive to determining that the telephone number is not located in the first geographic region. The processor, responsive to executing the computer instructions, can perform operations for transmitting a third request for the name authority pointer to an out-of-region name server that is associated with the second geographic region responsive to identifying the second geographic region. In turn, the processor, responsive to executing the computer instructions, can perform operations for receiving the name authority pointer from the out-of-region name server responsive to transmitting the third request.

One embodiment of the subject disclosure includes a computer-readable storage medium, including computer instructions, which when executed by a processor cause the processor to perform operations for transmitting a first request for a name authority pointer to a first in-region name server of a plurality of in-region name servers of a first geographic region responsive to determining that a telephone number of a call is located in the first geographic region. The computer instructions can further cause the executing processor to perform operations for transmitting a second request for the name authority pointer to an out-of-region name server associated with a second geographic region responsive to determining that the telephone number is located in the second geographic region. In turn, the computer instructions, when the executed by the processor, can cause the processor to perform operations for receiving the name authority pointer from at least one of the in-region name server or the out-of-region server.

FIG. 1 depicts an illustrative embodiment of a first communication system 100 for delivering media content. Communication system 100 can provide for all or a portion of the computing devices 130 to function as one or more subscriber servers 130. In one embodiment, a subscriber server 130 can use computing and communication technology to perform function 162, which can include, among other things, providing, obtaining, and/or assigning name authority pointers (NAPTR) for use in telephony communications by subscriber communication devices 116 of the communications system 100. In one embodiment, the subscriber server 130 can provide, obtain, and/or assign unique IP addresses to the communication devices 116 of the communication system 100. In turn, each NAPTR used in the communication system 100 can include an IP address for a communication device, e.g. the SIP URI for an IP based Voice enabled device. In one embodiment, the subscriber server 130 can provision computer devices throughout the communication system 100 with NAPTR information to allow pertinent NAPTR records to be accessed during a call session.

In one embodiment, the communication system 100 can include a national telephony system 180 that can be subdivided into a number of geographic regions. In one embodiment, each geographical region in the national system can include one or more processing sites for initiation of call processing. Each geographic region of the national telephony system 180 can include one or more telephone number mapping (ENUM) servers and one or more servers. In one embodiment, the national telephony system can require that call sessions originating from any geographic region inquire at a regional processing site in the geographical region of the call origination. A regional ENUM server 184 at the regional processing site can resolve a telephone number for a terminating device of the call to a NAPTR that can include an IP address for the terminating communication device or for a call session server that is responsible for sessions involving the terminating communication device.

In another embodiment, each regional processing site can include more than one regional ENUM server 184 to provide load balancing and fault tolerance across multiple servers. In one embodiment, if a first regional ENUM server 184 receives a request, or query, to resolve a telephone number to a NAPTR, but the first regional ENUM server is overloaded, lacking resources, or unavailable, then the request can be automatically transferred to a second regional ENUM server 184. In one embodiment, a regional ENUM server 184 can inquire to one or more regional name servers from a plurality of name servers available at the regional processing site.

In one embodiment, the communication system 100 can distribute NAPTR records for the national telephony system over sets of name servers 188 at each regional processing site in the national system. In one embodiment, the distributed ENUM service system can reduce the storage and searching requirements for any single name server device in the system. This decentralization can improve device uptime and reliability while decreasing call resolution processing time. In addition, in one embodiment, a hierarchy of telephone number-to-NAPTR resolution paths can provide efficient number resolution according to a distributed database scheme. In another embodiment, the ENUM resolution paths are scalable. Any geographic region can be split into two or more sub-regions to reduce the number of NAPTR records that must be stored and searched in that geographic region and to improve performance. Recently-resolved NAPTR results can be used to provide a highest speed response using cache memories. Regional calls can be processed using regional resources and smaller databases. National databases can be used, where needed, to resolve telephone numbers outside of the geographic region.

In one embodiment, a regional ENUM server 184 can receive a request for a NAPTR associated with a telephone number and can determine if the telephone number is from the same region. If it is, then in one embodiment, the regional ENUM server 184 can query an in-region name server 188 for a NAPTR associated with the in-region telephone numbers. If the telephone number is out-of-region, then in one embodiment the regional ENUM server 184 can query an out-of-region name server 188, located at the regional site, for the NAPTR of the out-of-region telephone number.

The communication system 100 can represent an Internet Protocol Television (IPTV) media system. The IPTV media system can include a super head-end office (SHO) 110 with at least one super head end office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, power line or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used in the media system of FIG. 1. The satellite broadcast television system can be overlaid, operably coupled with, or replace the IPTV system as another representative embodiment of communication system 100. In this embodiment, signals transmitted by a satellite 115 that include media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to an Internet Service Provider (ISP) network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

The subject disclosure can apply to other present or next generation over-the-air and/or landline media content services system.

Some of the network elements of the IPTV media system can be coupled to one or more computing devices 130, a portion of which can operate as a web server for providing web portal services over the ISP network 132 to wire line media devices 108 or wireless communication devices 116.

Communication system 100 can provide for all or a portion of the computing devices 130 to function as one or more subscriber servers 130. In one embodiment, a subscriber server 130 can use computing and communication technology to perform function 162, which can include, among other things, providing, obtaining, and/or assigning name authority pointers (NAPTR) for use in telephony communications by subscriber communication devices 116 of the communications system 100. In one embodiment, the subscriber server 130 can provide, obtain, and/or assign unique IP addresses to the communication devices 116 of the communication system 100. In turn, each NAPTR used in the communication system 100 can include an IP address for a communication device, e.g. the SIP URI for an IP based Voice enabled device.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 2:
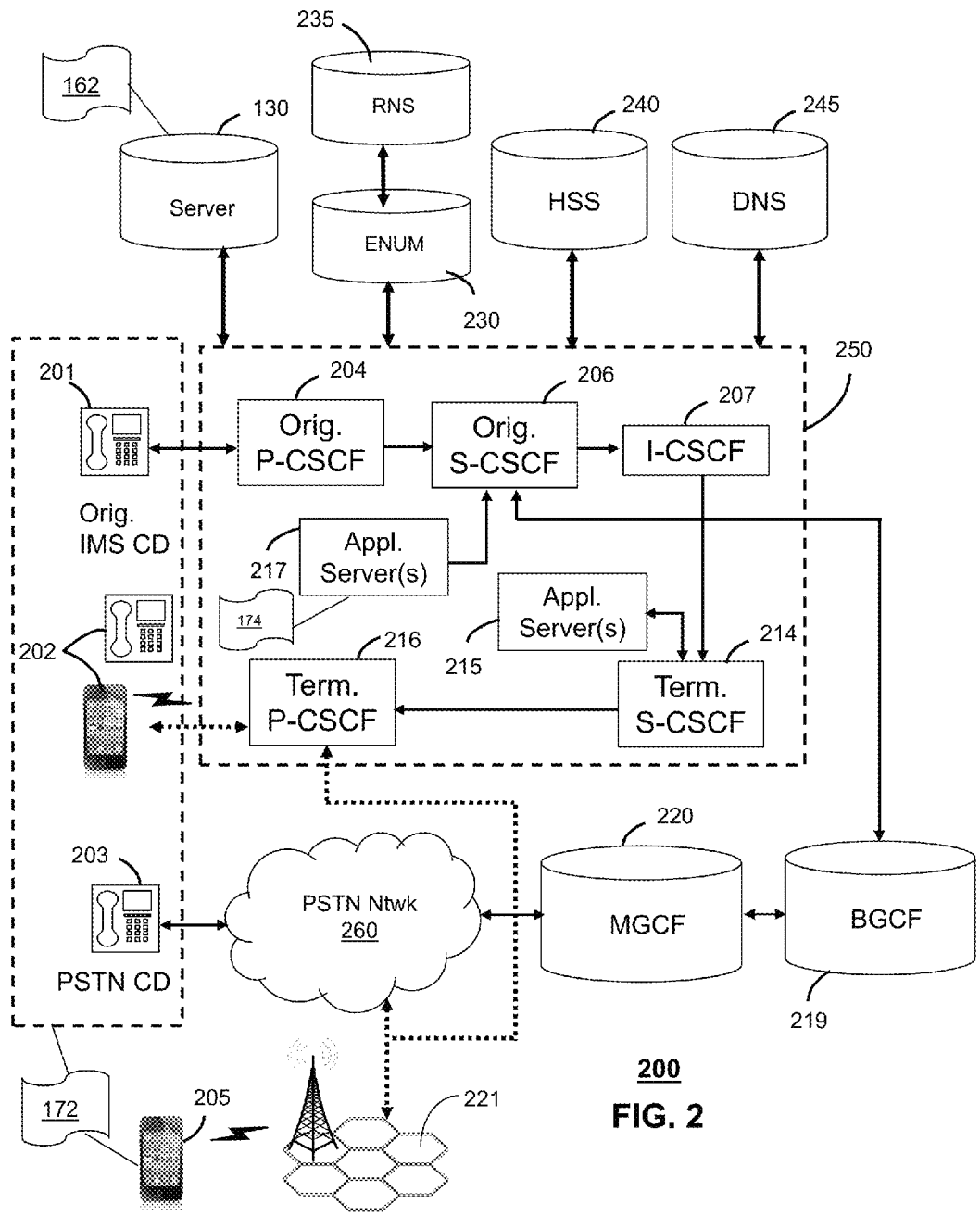

FIG. 2 depicts an illustrative embodiment of a communication system 200 employing P Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In one embodiment, the communication system 200 can be configured as a national telephony system that can be subdivided into a number of geographical regions. In one embodiment, an ENUM server 230 can be configured as a series of regional ENUM servers. In one embodiment, a regional name server (RNS) 235 can be configured as a series of regional name servers. In one embodiment, a call session can be initiated at the originating CD 201 at a first geographic region. The originating S-CSCF 206 at the first geographic region can inquire at a regional ENUM server 230 for that first geographic region to seek to resolve a telephone number for a terminating CD 202 to an IP address for the terminating CD 202.

In one embodiment, the regional ENUM server 230 can determine if a geographic area associated with the telephone number of the terminating CD 202, such as a numbering plan area (NPA) code, is within the first geographic region of the RNS 235. In one embodiment, the regional ENUM server 230 can compare a NPA code from the telephone number to a list of regional NPA codes to determine if the telephone number is within the first geographic region. If the telephone number corresponds to a first geographic region call (i.e., is a call from an originating CD 201 in the first geographic region to a terminating CD 202 in the first geographic region), then the ENUM server 230 can inquire to an in-region RNS 235 for the NAPTR of the terminating device. If the NPA cod for the telephone number is found by the ENUM server 230 to not be within the first geographic region, then the regional ENUM server 230 can determine a second geographic region that correctly corresponds to the NPA code. In one embodiment, the ENUM server 230 can send a request to an out-of-region RNS 235 for NAPTR of the terminating device.

In one embodiment, the communication system 200 can distribute NAPTR records for the national telephony system among many RNS servers 235 at several regional processing sites. In one embodiment, a subscriber server 130 can provision NAPTR records among several in-region RNS 235 at each regional site such that each in-region RNS 235 only stores and only provides searching services for NAPTR records for telephone numbers corresponding to NPA area codes in the geographic region of the terminating device. In another embodiment, the subscriber server 130 can provision NAPTR records among an out-of-region RNS 235 at each regional site, so that each regional site includes at least one out-of-region RNS 235 to handle out-of-region calls. Each out-of-region RNS 235 only stores and provides searching services for NAPTR records for telephone numbers corresponding to NPA area codes that are outside the geographic region of the calling device.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wire line or wireless devices. For example, the CDs of FIG. 2 can be communicatively coupled to a cellular base station 221, a femtocell, a WiFi router, a Digital Enhanced Cordless Telecommunications (DECT) base unit, or another suitable wireless access unit to establish communications with the IMS network 250 of FIG. 2. The cellular access base station 221 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wire line and wireless communication technologies can be used by the CDs of FIG. 2.

Cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The subscriber server 130 of FIG. 1 can be operably coupled to the second communication system 200 for purposes similar to those described above. It is further contemplated by the subject disclosure that the subscriber server 130 can perform function 162 and thereby provide NAPTRs for use in telephony communications involving the CDs 201, 202, 203 and 205 of FIG. 2. CDs 201, 202, 203 and 205, which can be adapted with software to perform function 172 to utilize the services of the subscriber server 130. It is further contemplated that the subscriber server 130 can be an integral part of the application server(s) 217 performing function 174, which can be substantially similar to function 162 and adapted to the operations of the IMS network 250.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 3:
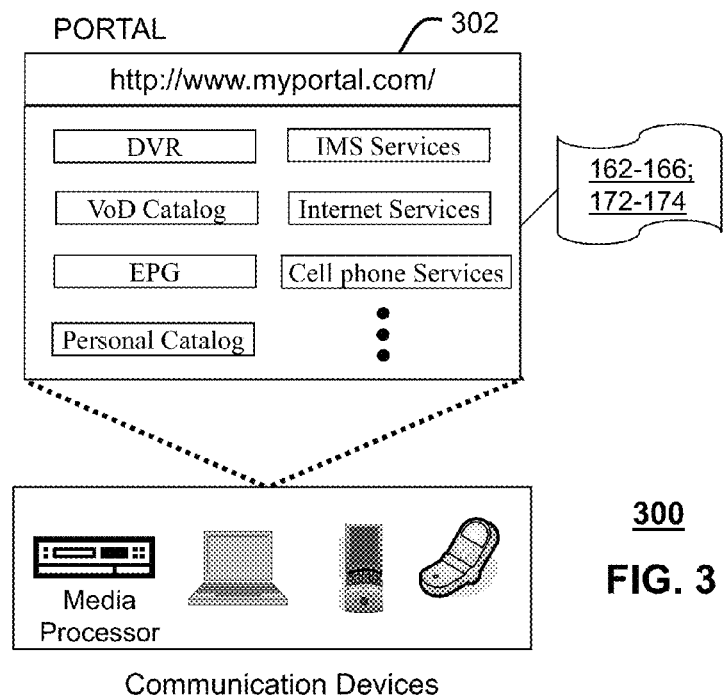
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can further be utilized to manage and provision software applications 162-166, and 172-174 to adapt these applications as may be desired by subscribers and service providers of communication systems 100-200.

Figure 4:
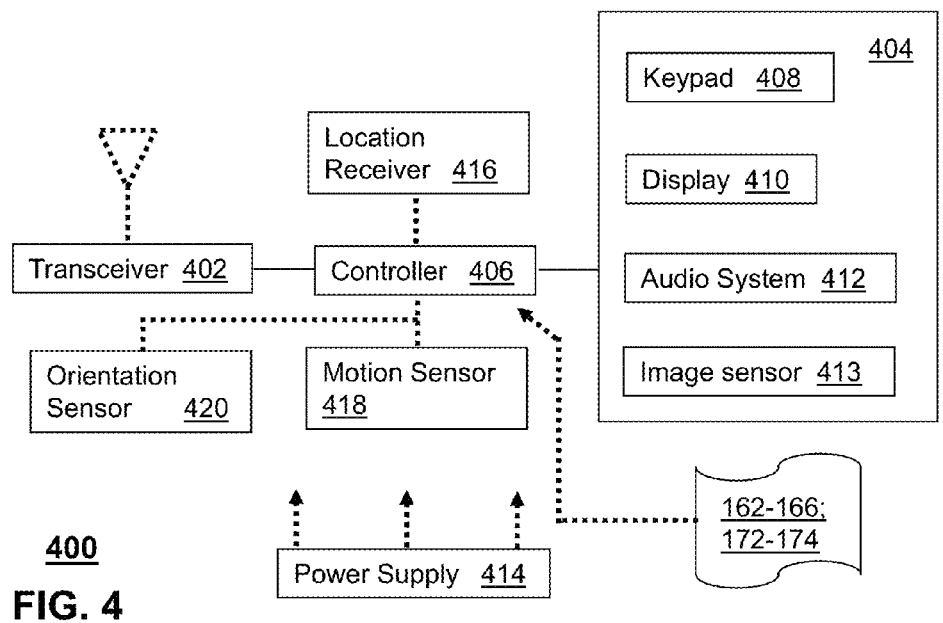
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wire line and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wire line access technologies (such as PSTN), packet-switched wire line access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wire line interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 110 can be an integral part of the housing assembly of the communication device 100 or an independent device communicatively coupled thereto by a tethered wire line interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), and/or a video processor with associated storage memory such as Flash, ROM, RAM, SRAM, DRAM, or other storage technologies for executing computer instructions, controlling, and processing data supplied by the aforementioned components of the communication device 100.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 100 can also include a slot for adding or removing an identity module such as a Subscriber Identity Module (SIM) card. SIM cards can be used for identifying subscriber services, executing programs, storing subscriber data, and so forth.

The communication device 400 as described herein can operate with more or less of the circuit components shown in FIG. 4. These variant embodiments can be used in one or more embodiments of the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
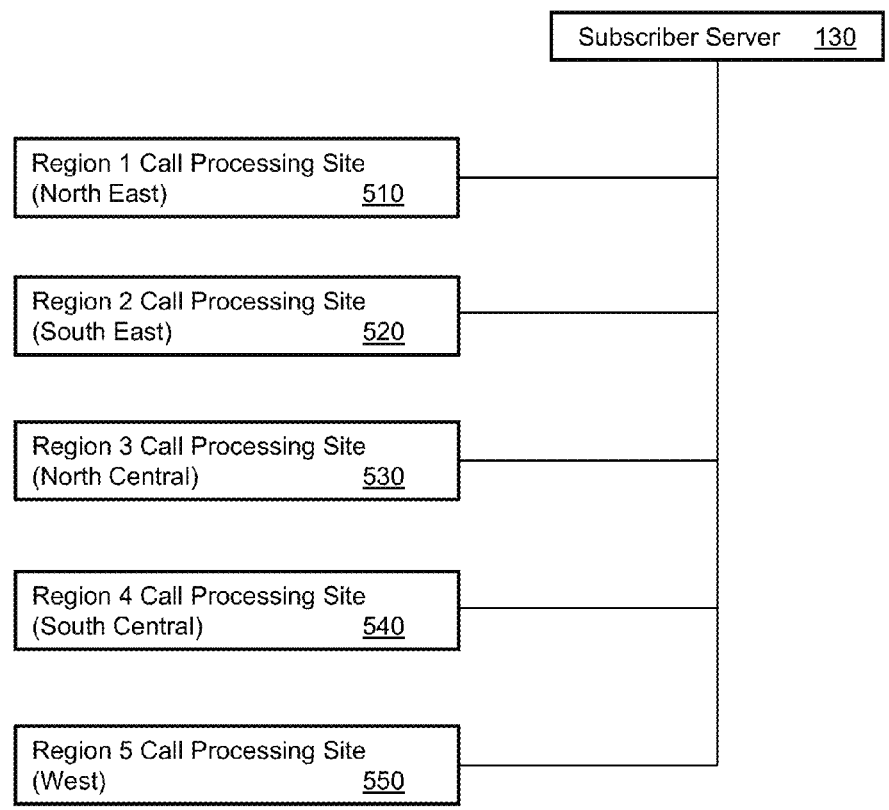
FIGS. 5-6 depict an illustrative embodiments of a system for delivering name authority pointers for the communications system of FIGS. 1-2.
Figure 6:
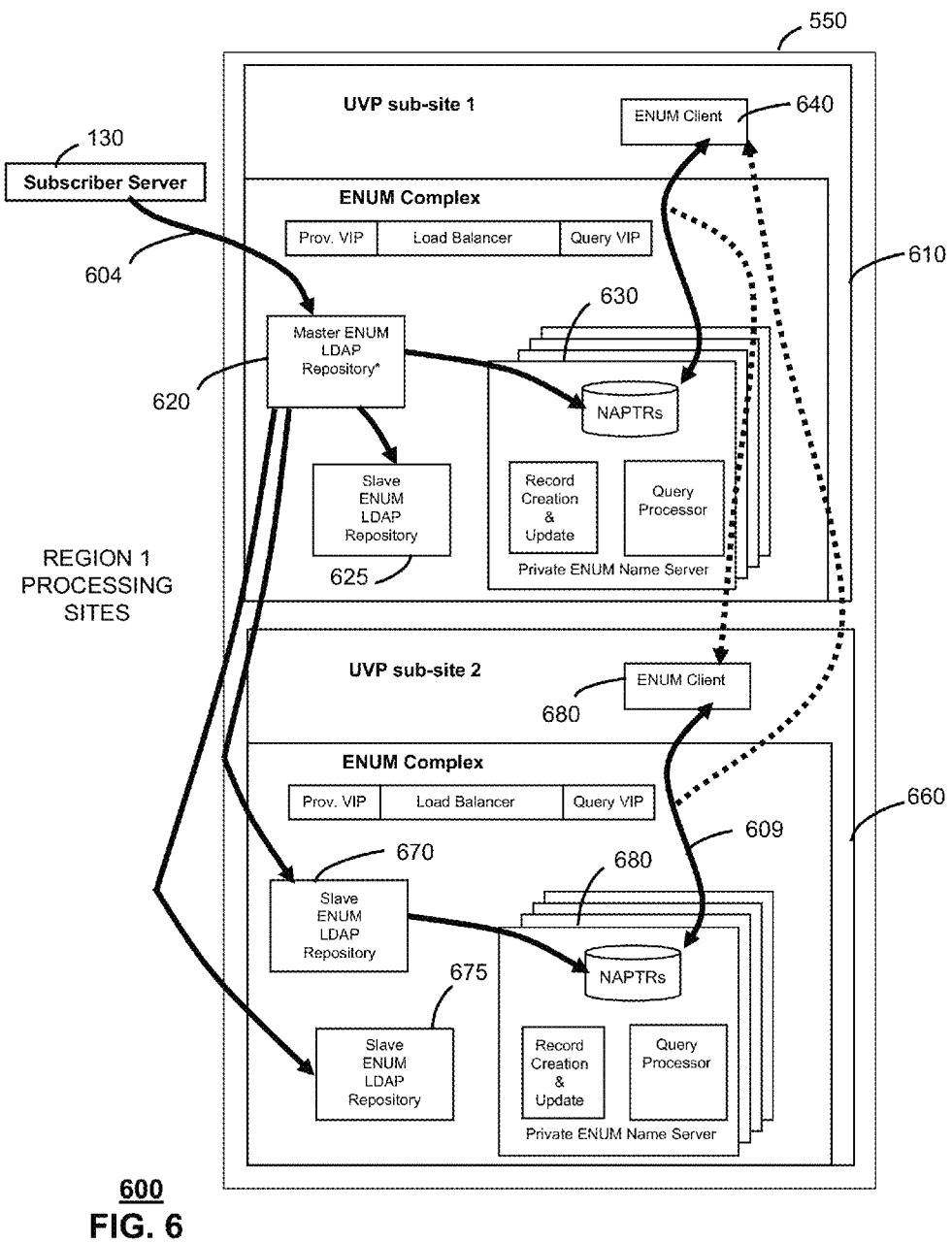

FIGS. 5-6 depict illustrative embodiments of the communication system of FIGS. 1-2. In one embodiment, a hierarchical telephone number mapping system 500 for a scalable and decentralized telephone number mapping is shown. Referring to FIG. 5, in one embodiment, the system 500 includes a national subscriber server 1330 and a series of regional call processing sites 510, 520, 530, 540, and 550. For example, regional call processing sites 510-550 can be established for the North East, South East, North Central, South Central, and South regions of the nation, respectively. Other geographic or non-geographic regional devices are possible.

Referring now to FIG. 6, a regional processing site 510 can be constructed from one or more sub-sites 610-660. For example, the region 5 (West) processing site 550 can be realized using a combination of two sub-sites 610 and 660, where each sub-site is in a different location within the West Region of the nation. In one example, the first sub-site 610 can be in the Oakland, Calif., and the second sub-site 660 can be in Sherman Oaks, Calif. Each sub-site 610 and 660 services the West region. In one embodiment, the sub-sites 610 and 660 within the regional processing site 550 are in interactive communication to facilitate sharing of workload.

In one embodiment, each regional sub-site 610 and 660 can include one or more ENUM lightweight directory access protocol (LDAP) repositories 620, 625. In a further embodiment, one of the ENUM LDAP repositories 620 can be configured as a master while one or more other ENUM LDAP repositories 625, 670, and 675 can be configured as slaves. In one embodiment, each master ENUM LDAP repository 620 allows the sub-site 610 to process NAPTR replication processing regardless of the destination geographic area of the terminating device. In another embodiment, master ENUM LDAP repositories 620 can be duplicated and distributed to other sites 510-550 and sub-sites 660 across the national telephony processing network 500. Slave ENUM LDAP repositories 625, 670, and 675 facilitate load balancing and redundancy for maximizing the efficiency of NAPTR replication processing while providing fault tolerance.

In one embodiment, the processing sub-sites 610 and 660 include multiple name servers 630 and 680. The name servers store NAPTR records corresponding to communication devices that can be accessed through the communication network 200. In one embodiment, a sub-site 610 can include multiple in-region name servers and multiple out-of-region name servers. In one embodiment, the name servers are scalable to facilitate growth of usage and to account for regional imbalances in access. For example, a sub-site 610 can have a number of in-region name servers 630, where each in-region server can include a complete set of all NAPTR records corresponding to every telephone number in the geographic region of the processing site 510. For instance, a sub-site 610 in Oakland, Calif., can include 20 in-region name servers 630, where each in-region server further includes a complete NAPTR listing for all telephone numbers in the West region. If access patterns indicate that additional NAPTR lookup capacity is needed in the West region at the Oakland sub-site, then additional in-region servers can easily be added. In another embodiment, if usage patterns indicate a need for more capacity only in a particular NPA code region, such as only in the California 213 region, then one or more name servers 630 can be added that are confined to this sub-set of NPA codes for the West region.

In one embodiment, the sub-sites 610 can include one or more servers that contain entire NAPTR sets for out-of-region telephone numbers. For example, the Oakland sub-site 610 can include an out-of-region name server with the NAPTR set for all telephone numbers in the South Central Region that includes Texas, Oklahoma, and Louisiana. Similarly, the Oakland sub-site 610 can include out-of-region name servers 630 for the other national regions (North East, North Central, and South East). In another embodiment, addition out-of-region name servers 630 can be added to accommodate usage patterns.

The combination of in-region and out-of-region name servers 630 at each sub-site allows for processing of any national telephone number at any sub-site. In addition, dividing the NAPTR sets between in-region and out-of-region name servers 630 allows the overall database at each name server to be maintained at a sufficiently small size to facilitate efficient query search and response. Also, since in-region and out-of-region name servers 630 can be added or subtracted from the sub-site 610, fast NAPTR responses can be provided from a sub-site 610, or, in some circumstances, from a site 550 without requiring interstate communication or excessive equipment.

In one embodiment, the processing site 550 is provisioned by a subscriber server 130 that can collect, catalog, and distribute NAPTR records that link telephone numbers to IP addresses for communication devices. In one embodiment, the subscriber serer 130 can access telephone number and IP address data for communication devices subscribed for usage on the communication system 100-200 or for other communication systems that can be accessed from the communication system 100-200. In one embodiment, the subscriber server 130 can distribute NAPTR data 604 to a master ENUM LDAP Repository 620 at a site 550 or a sub-site 610, 660. The NAPTR data 604 can include records for in-region telephone numbers and for out-of-region telephone numbers. The master ENUM LDAP Repository 620 can further distribute the NAPTR sets to the regional name servers 630 and 680 through the master ENUM LDAP Repository 620 and/or through any of several slave ENUM LDAP Repositories 625, 670, and 675.

In one embodiment, a site 550 can be accessed when a call session initiated from within the communication system 100-200 is initiated within the geographic region of the site 550. In one embodiment, a query is initiated that is forwarded to the sub-site 610, 660 that is closest to the calling party. In other embodiment, the query can be routed to either sub-site depending on operational factors, such as capacity, volume of calls, maintenance, and/or downtown at the sub-sites. In one embodiment, the query can be handled by an ENUM client 640 at the sub-site 610. The ENUM client 640 can determine whether the telephone number of the terminating device that is referenced by the query is a number that is within the geographic region of the site 550. In one embodiment, the ENUM client 640 can compare the NPA code of the terminating communication device to a set of NPA codes for the processor site 550. If the telephone number is within the region, then the ENUM client 640 can send a request to an in-region name server 630 for a NAPTR associated with the number. If the telephone number is not in-region, then the ENUM client can further process the query by determining which region of the national system matches the telephone number. For example, the ENUM client 640 can compare the NPA of the telephone number to a set of all NPA codes in the national system and determine which region corresponds to the NPA code. In one embodiment, the ENUM client 640 can then forward a request to the correct out-of-region naming server 630 at the sub-site 610.

In one embodiment, the ENUM client 640 at the sub-site 610 can forward the received query to an ENUM client 640 at the other sub-site 660. For example, a query received at the Oakland sub-site 610 can be forwarded to the Sherman Oaks sub-site 660 for processing. In one embodiment, forwarding can be initiated by a lack of availability of the ENUM client 640 or by an over-loading of the sub-site 610. In another embodiment, an availability issue with any part of the sub-site 610, such as with any part of the name servers 630 can trigger a re-routing of the query from the first sub-site 610 to the second sub-site 660. In one embodiment, the ENUM client 640 of one sub-site 610 can directly access a regional name server 680 of a second sub-site 660, without re-routing the query to the ENUM client 680 of the second sub-site 660.

Figure 7:
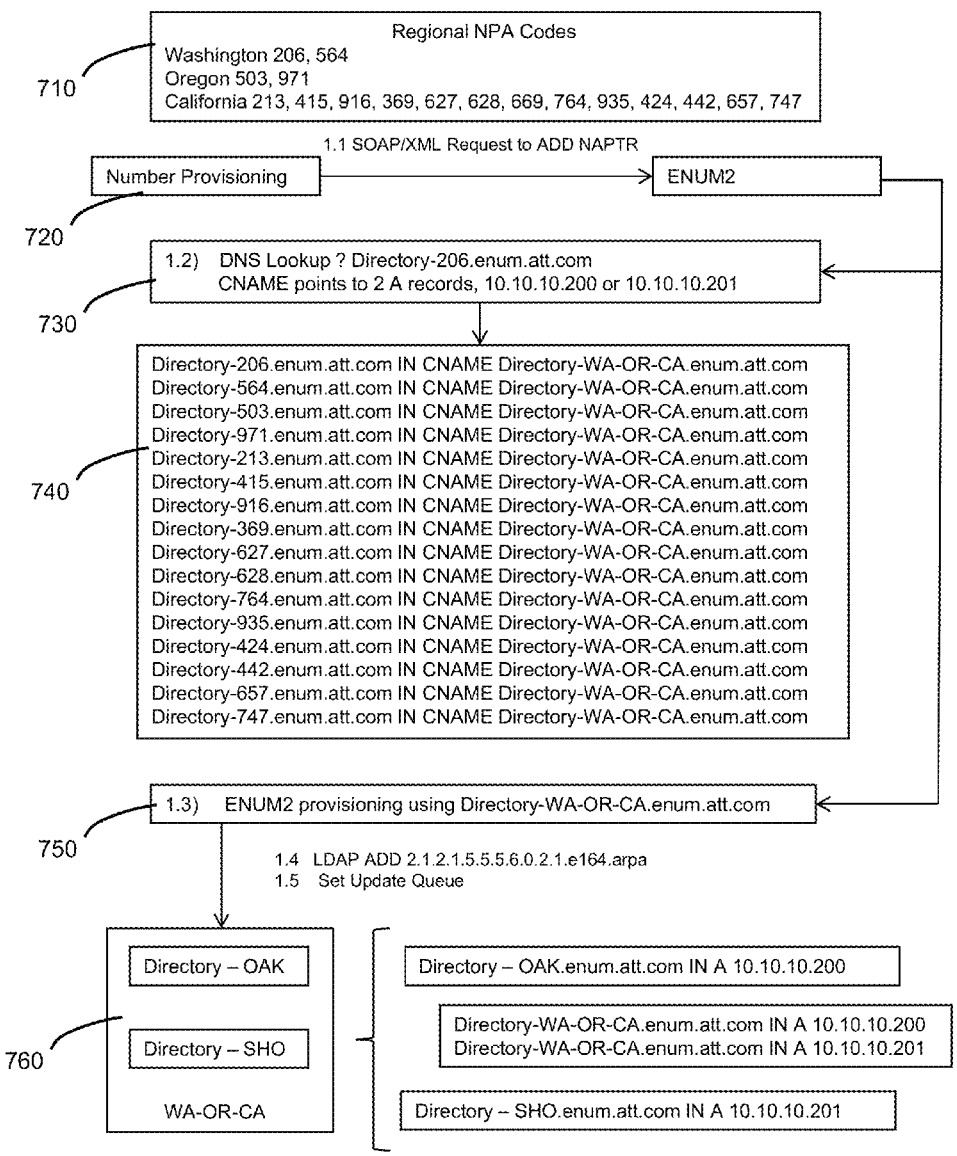
FIGS. 7-9 depict illustrative embodiments of provisioning name authority pointers associated with telephone numbers.
Figure 8:
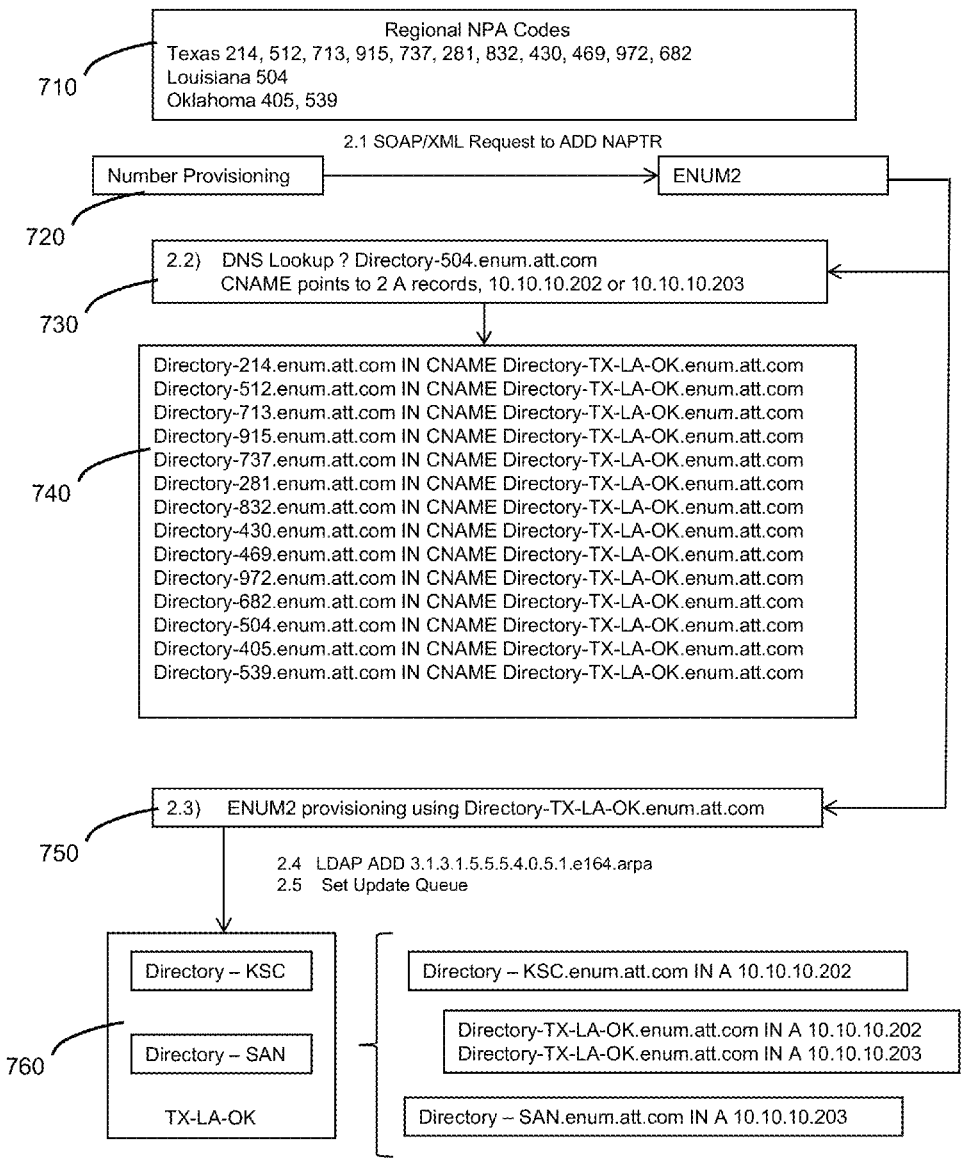
Figure 9:
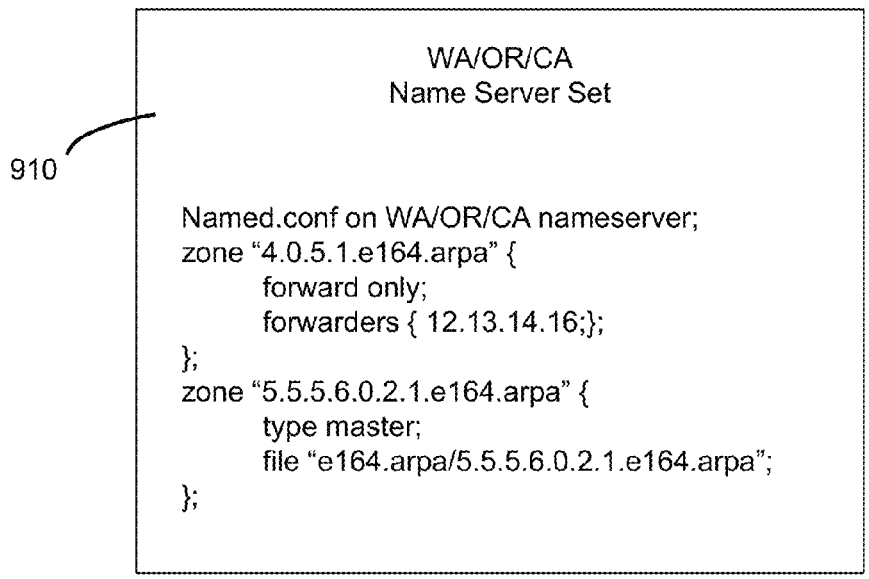
Figure 9:
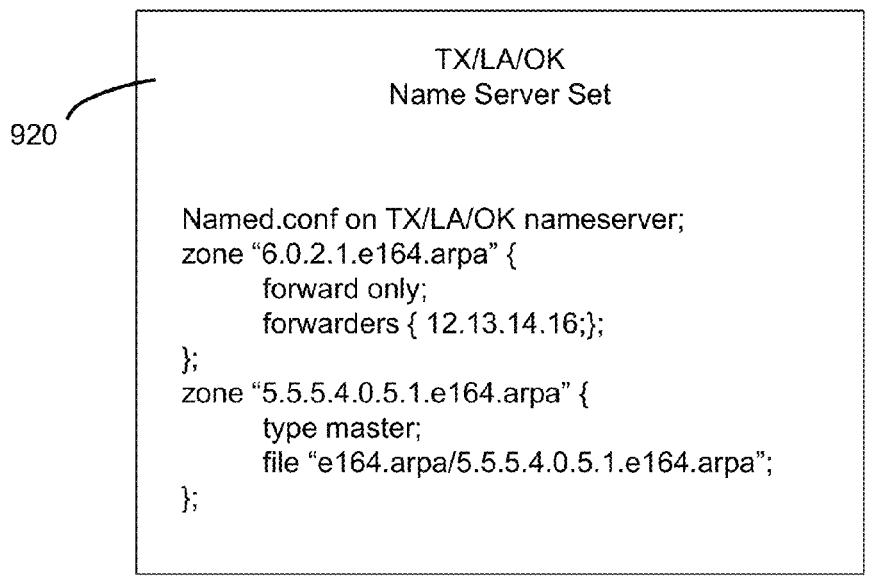

FIGS. 7-9 depict illustrative embodiments of provisioning NAPTR sets to regional sites and sub-sites in the national system. FIG. 7 depicts an exemplary provisioning of a NAPTR set for the West Region of the national system. FIG. 8 depicts an exemplary provisioning of a NAPTR set for the South Central Region. NPA codes 710 for the region are added by number provisioning 720 using a series of requests to add NAPTR records. Directories 740 are created for each NPA code. The created directories are provisioned 750 to the sub-sites at the site 760.

FIG. 9 depicts provisioning for forwarding 910 and 920 queries of telephone numbers with NPA codes that are outside of the region. For example, at the West region (WA/OR/CA), a NPA code of "504"—communicated by standard e.164 coding as "4.0.5"—generates a forwarding event at the software code. The "504" NPA corresponds to the State of Louisiana, which is in the South Central region. If a "504" NPA code is encountered by a West region sub-site, then the sub-site automatically forwards the query to the out-of-region name server for the South Central region. In one embodiment, the forwarding process uses Anycast IP addressing as, in this case, where the query is forwarded to IP address "12.13.14.16." Similarly, a telephone number query with an NPA of "206" at the South Central region will result, by provisioned code, in a forward to an out-of-region name server Anycast IP addressed at "12.13.14.17."

Figure 10:
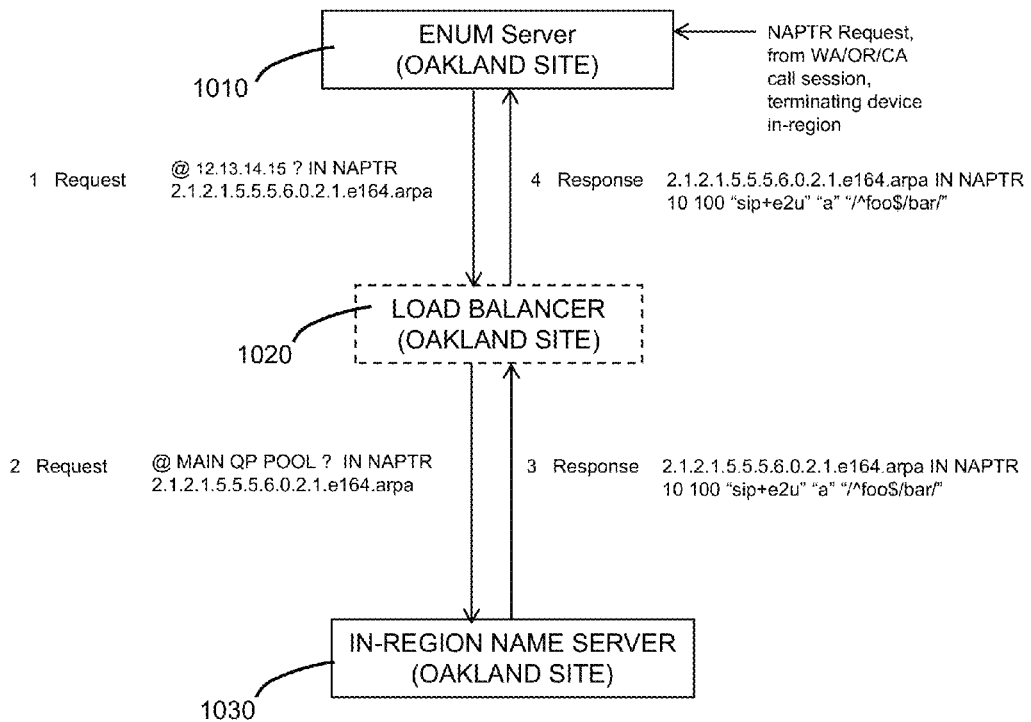
FIGS. 10-12 depict illustrative embodiments of data flow within the communication system of FIGS. 1-2 and 5-6.
Figure 11:
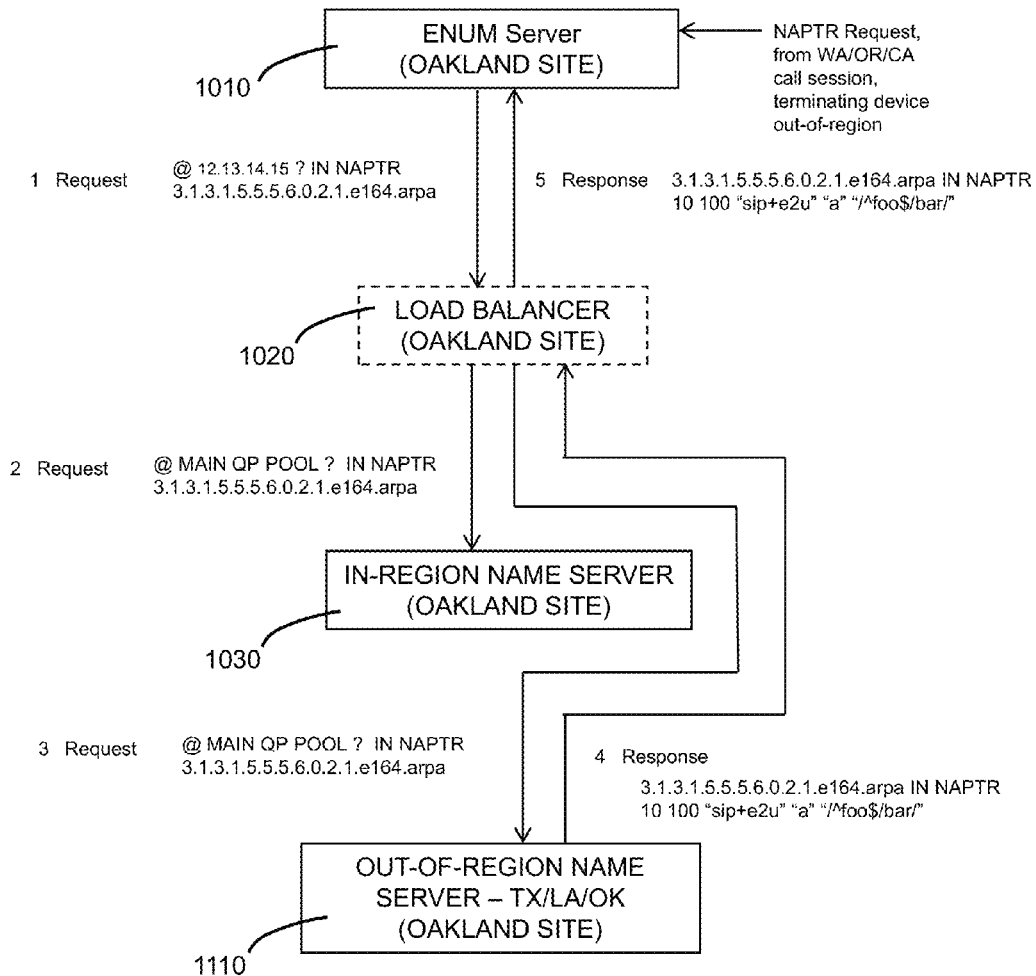
Figure 12:
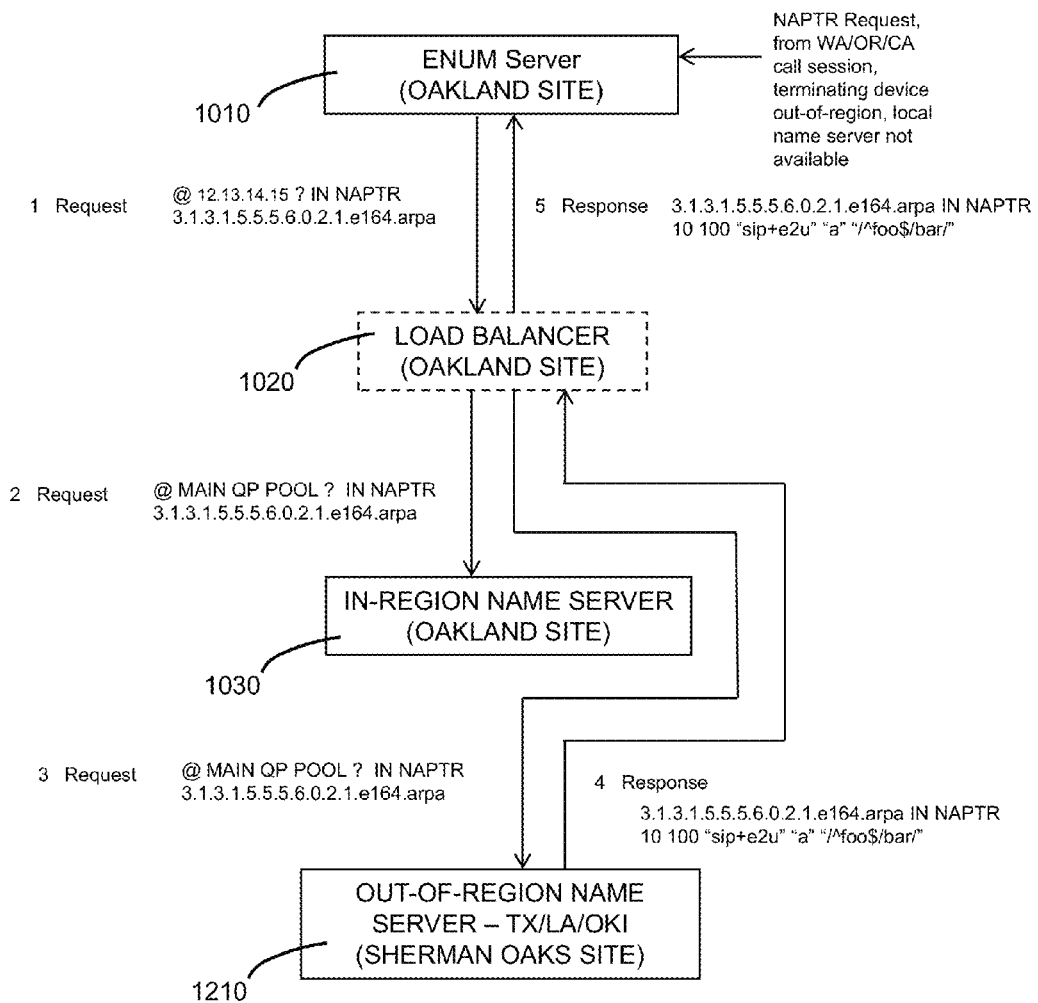

FIGS. 10-12 depict illustrative embodiments of data flow within the communication system of FIGS. 1-2 and 5-6. Referring now to FIG. 10, in one embodiment, a NAPTR request is received at the ENUM Server 1010. The ENUM Server 1010 can send a request to an in-region name server 1030 at the site. In one embodiment, an optional load balancer 1020 at the site can route requests at the site. The load balancer 1020 can alter routing to take into account changes in local loading, available resources at a second sub-site, and/or unavailable local resources. In one embodiment, a response to the request can be sent from the in-region name server 1030 to the ENUM server 1010. If used, the load balancer can route the response. Referring to FIG. 11, the NAPTR request received at the ENUM server 1010 is for an out-of-region telephone number. In one embodiment, the request is re-routed assay from the in-region name server 1030 and to an out-of-region name server that is located at the local site (Oakland). Referring to FIG. 12, the NAPTR request received at the ENUM server 1010 is also for an out-of-region telephone number. However, in this example, the response is sent to an out-of-region name server 1210 at another sub-site (Sherman Oaks). For example, the ENUM server 1010 or the load balance 1020 can detect a problem with availability of an out-of-range name server at the local sub-site.

Figure 13:
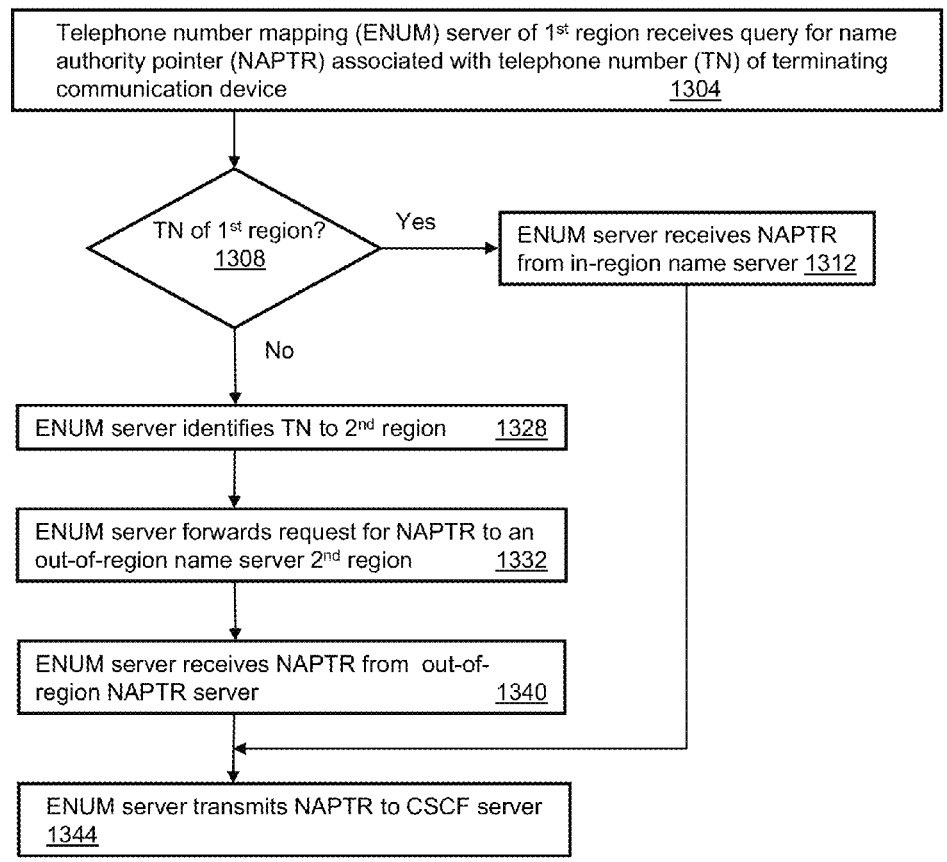
FIG. 13 depicts illustrative embodiments of a method operating in portions of the systems described in FIGS. 1-2, 5-6, and 7-9.

FIG. 13 depicts an illustrative method 1300 that operates in portions of the devices of FIGS. 1-2, 5, and 6. Method 1300 can begin with step 1304 in which, a telephone number mapping (ENUM) server 640 at a site or sub-site of a first geographic region can receive a query from a call session control function (CSCF) server 206 for a name authority pointer (NAPTR) associated with a telephone number (TN) of a terminating communication device (CD) 202. In one embodiment, the CSCF Server 206 at the first geographic region can receive a call session initiation protocol (SIP) from an originating CD 201. The CSCF server 206 can send a request to the ENUM server 640 of the first geographic region for a mapping of a terminating CD 202 telephone number to an IP address. In step 1308, the ENUM server 640 can determine if the telephone number is within the first geographic region. In one embodiment, the ENUM server 640 can compare the NPA of the telephone number against a set of NPA codes that have been assigned to the first region. In one embodiment, if the ENUM server 640 identifies telephone number as an in-region number, then, in step 1308, then the ENUM server 640 can receive the NAPTR from an in-region name server 630 at the site or sub-site.

In one embodiment, if the ENUM server 610 identifies the telephone number as not being in the region, then the ENUM server 610, in step 1328, can identify a second region that the telephone number is within. In one embodiment, the ENUM server 610 can compare the NPA of the telephone number to a national set of NPA codes to determine which region of the national system contains the telephone number. In one embodiment, the ENUM server 610 can then forward, in step 1332, the NAPTR for the telephone number to the out-of-region name server 630 at the site or sub-site. In one embodiment, the out-of-region name server 630 can respond with the requested NAPTR, in step 1340, which can then be forwarded to a CSCF server 206, in step 1344.

Upon reviewing the aforementioned embodiments, it would be evident to an artisan with ordinary skill in the art that said embodiments can be modified, reduced, or enhanced without departing from the scope and spirit of the claims described below. For example, in one embodiment, a load balancer can determine whether the telephone number is in-region or out-of-region and can, in turn, direct the request to either the in-region or the out-of-region name server based on this determination. In another embodiment, the ENUM server can transmit the request for the NAPTR of the telephone number to in-region name server for every received request. The in-region name server can then determine if the queried telephone number is in-region or out-of-region based on the NPA code. In another embodiment, where the in-region name server is tasked to determine whether the telephone number is in-region, the in-region name server can forward the telephone number to the appropriate out-or-region name server, if the telephone number is out-of-region.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 14:
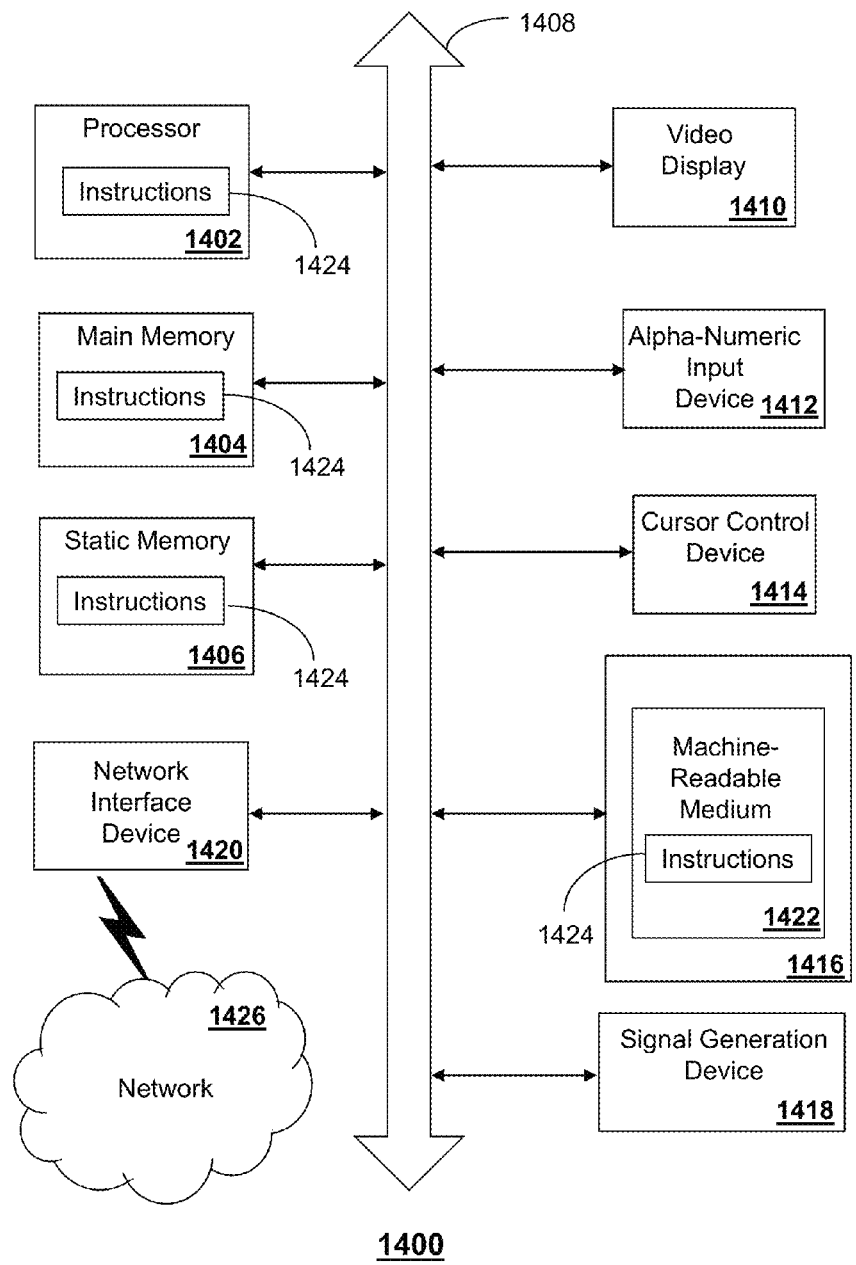
FIG. 14 is a diagrammatic representation of a machine in the form of a computer system within which a set of instructions, when executed, may cause the machine to perform any one or more of the methods described herein.

FIG. 14 depicts an exemplary diagrammatic representation of a machine in the form of a computer system 1400 within which a set of instructions, when executed, may cause the machine to perform any one or more of the methods describe above. One or more instances of the machine can operate, for example, as the subscriber server 130, media processor 106, CDs 201-205, originating CSCF 206, terminating CSCF 214, HSS 240, ENUM server 230, and other devices of FIGS. 1-4. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1400 may include a processor (or controller) 1402 (e.g., a central processing unit (CPU), a graphics processing unit (GPU, or both), a main memory 1404 and a static memory 1406, which communicate with each other via a bus 1408. The computer system 1400 may further include a video display unit 1410 (e.g., a liquid crystal display (LCD), a flat panel, or a solid state display. The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a tangible computer-readable storage medium 1422 on which is stored one or more sets of instructions (e.g., software 1424) embodying any one or more of the methods or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 1400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   determining, by a telephone number mapping server comprising a processor, whether a telephone number is located in a first geographic region of a plurality of geographic regions of a telephone system based on a numbering plan area code of the telephone number;
   identifying, by the telephone number mapping server, a first in-region name server that is associated with the first geographic region responsive to determining that the telephone number is located in the first region;
   the first in-region name server that is identified;
   identifying, by the telephone number mapping server, a second geographic region that is associated with the telephone number based on the numbering plan area code of the telephone number responsive to determining that the telephone number is not located in the first geographic region;
   identifying, by the telephone mapping server, a first out-of-region name server that is associated with the second geographic region that is identified, wherein the first out-of-region name server is not associated with the first geographic region;
a request for the name authority pointer associated with the telephone number to the first out-of-region name server n, wherein the request is transmitted to the first out-of-region name server according to a determination by a load balancer that a second out-of-region name server is not available;
receiving, by the telephone number mapping server, the name authority pointer from the first out-of-region name server responsive to forwarding the request for the name authority pointer; and
transmitting, by the telephone number mapping server, the name authority pointer that is received to a call session control function associated with the call.

2. The method of claim 1, wherein a plurality of in-region name servers are provisioned with a plurality of name authority pointers associated with a plurality of telephone numbers located in the first geographic region.

3. The method of claim 1, wherein the first out-of-region name server is provisioned with a plurality of name authority pointers associated with a plurality of telephone numbers that are located in the second geographic region.

4. The method of claim 1, wherein the forwarding of the request for the name authority pointer to the first out-of-region name server comprises transmitting the request to an anycast internet protocol address associated with the first out-of-region name server.

5. The method of claim 1, comprising receiving, by the telephone number mapping server, the request for the name authority pointers from a second telephone number mapping server in the first geographic region responsive to a determination that the telephone number mapping server is unavailable to process requests.

6. The method of claim 1, comprising storing, at the telephone number mapping server, a name server status associated with the telephone number mapping server.

7. The method of claim 1, comprising receiving, by the telephone number mapping server, a request for the name authority pointer associated with the telephone number of the call originating in the first geographic region of the plurality of geographic regions, wherein the telephone number mapping server is located in the first geographic region.

8. A device, comprising:
a memory storing computer instructions; and
a processor coupled to the memory, wherein the processor responsive to executing the computer instructions performs operations comprising:
determining whether a telephone number is located in a first geographic region of a plurality of geographic regions of a telephone system responsive to receiving a first request for a name authority pointer associated with the telephone number;
identifying a first in-region name server that is associated with the first geographic region responsive to determining that the telephone number is located in the first region;
the first in-region name that is identified;
receiving the name authority pointer from the first in-region name server responsive to transmitting the second request;
identifying a second geographic region of the plurality of geographic regions that is associated with the telephone number responsive to determining that the telephone number is not located in the first geographic region;
identifying a first out-of-region name server that is associated with the second geographic region that is identified, wherein the first out-of-region name server is not associated with the first geographic region;
transmitting a third request for the name authority pointer to the first out-of-region name server that is identified, wherein the third request is transmitted to the first out-of-region name server according to a determination by a load balancer that a second out-of-region name server is not available; and
receiving the name authority pointer from the first out-of-region name server responsive to transmitting the third request.

9. The device of claim 8, wherein a plurality of in-region name servers are provisioned with a plurality of name authority pointer associated with a plurality of telephone numbers located in the first geographic region.

10. The device of claim 8, wherein the first out-of-region name server is provisioned with a plurality of name authority pointers associated with a plurality of telephone numbers that are located in the second geographic region.

11. The device of claim 8, wherein determining whether the telephone number is located in the first geographic region of the plurality of geographic regions is based on a numbering plan area code of the telephone number.

12. The device of claim 8, wherein identifying the second geographic region of the plurality of geographic regions that is associated with the telephone number is based on a numbering plan area code of the telephone number.

13. The device of claim 8, wherein the processor further performs operations comprising transmitting the received name authority pointer to a call session control function associated with the call.

14. The device of claim 8, wherein the transmitting of the third request for the name authority pointer to the first out-of-region name server comprises transmitting the third request to an anycast internet protocol address associated with the first out-of-region name server.

15. The device of claim 8, wherein the processor further performs operations comprising receiving the first request for the name authority pointer from a first telephone number mapping server in the first geographic region responsive to a determination that the first telephone number mapping server is unavailable to process name authority pointer requests.

16. A non-transitory computer-readable storage medium, comprising computer instructions, which when executed by a processor, cause the processor to perform operations comprising:
determining whether a telephone number is located in a first geographic region of a plurality of geographic regions of a telephone system responsive to receiving a first request for a name authority pointer associated with the telephone number;
identifying a first in-region name server that is associated with the first geographic region responsive to determining that the telephone number is located in the first region;
second request for a name authority pointer to the first in-region name server that is identified;
receiving the name authority pointer from the first in-region name server responsive to transmitting the second request;
identifying a second geographic region of the plurality of geographic regions that is associated with the telephone number responsive to determining that the telephone number is not located in the first geographic region;

identifying a first out-of-region name server that is associated with the second geographic region that is identified, wherein the first out-of-region name server is not associated with the first geographic region;

third request for the name authority pointer to the first out-of-region name server that is identified, wherein the third request is transmitted to the first out-of-region name server according to a determination by a load balancer that a second out-of-region name server is not available; and receiving the name authority pointer from one of the in-region name server or the first out-of-region server.

17. The non-transitory computer-readable storage medium of claim 16, wherein the processor further performs operations comprising transmitting the received name authority pointer to a call session control function server associated with the call.

18. The non-transitory computer-readable storage medium of claim 16, wherein the processor further performs operations comprising receiving the name authority pointer from a cache memory responsive to determining that the name authority pointer is stored in the cache memory.

19. The non-transitory computer-readable storage medium of claim 16, wherein the processor further performs operations comprising receiving a request for the name authority pointer from a first telephone number mapping server in the first geographic region responsive to determining that the first telephone number mapping server is unavailable to process requests.

20. The non-transitory computer-readable storage medium of claim 16, wherein a plurality of in-region name servers are provisioned with a plurality of name authority pointers associated with a plurality of telephone numbers located in the first geographic region.

* * * * *